US012711328B2

(12) United States Patent
Rathnam et al.

(10) Patent No.: US 12,711,328 B2
(45) Date of Patent: Aug. 18, 2026

(54) SYSTEMS, METHODS, AND APPARATUS FOR SWITCHING BETWEEN AND DISPLAYING TRANSLATED TEXT AND TRANSCRIBED TEXT IN THE ORIGINAL SPOKEN LANGUAGE

(71) Applicant: Wordly, Inc., Mountain Viiew, CA (US)

(72) Inventors: Lakshman Rathnam, Mountain View, CA (US); Robert James Firby, Mountain View, CA (US); Shawn Nikkila, Mountain View, CA (US); Kirk Hendrickson, Mountain View, CA (US)

(73) Assignee: WORDLY, INC., Los Altos, CA (US)

( * ) Notice: Subject to any disclaimer, the term of this patent is extended or adjusted under 35 U.S.C. 154(b) by 328 days.

(21) Appl. No.: 17/736,941

(22) Filed: May 4, 2022

(65) Prior Publication Data

US 2022/0405492 A1 Dec. 22, 2022

Related U.S. Application Data

(63) Continuation-in-part of application No. 16/992,489, filed on Aug. 13, 2020.

(Continued)

(51) Int. Cl.
*G10L 13/00* (2006.01)
*G06F 3/0482* (2013.01)

(Continued)

(52) U.S. Cl.
CPC ............ *G06F 40/58* (2020.01); *G06F 3/0482* (2013.01); *G06F 3/0484* (2013.01); *G06F 40/51* (2020.01); *G10L 15/26* (2013.01)

(58) Field of Classification Search
None
See application file for complete search history.

(56) References Cited

U.S. PATENT DOCUMENTS 6,385,586 B1 * 5/2002 Dietz ...................... G10L 13/00 704/277
9,031,829 B2 * 5/2015 Leydon ................ G06Q 10/107 463/31

(Continued)

*Primary Examiner* — Jakieda R Jackson
(74) *Attorney, Agent, or Firm* — Alford Law Group, Inc.; Tobi C. Clinton

(57) ABSTRACT

A method for managing a cloud-based meeting between participants that speak and understand different languages is disclosed. The method includes receiving, via a microphone at a first client device, first audio content in a first language preference of a first meeting participant; transcribing the first audio content into a first transcribed text by using the first language preference; receiving, from a second client device, a second language preference that is different from the first language preference; translating the first transcribed text into a second transcribed text by using the second language preference; and transmitting the first and second transcribed text to the second client device. The second client device is configured to concurrently display the first transcribed text and the second transcribed text on a display device. The second client device can also be configured to provide a second audio content from the second transcribed text.

20 Claims, 11 Drawing Sheets

Related U.S. Application Data

(60) Provisional application No. 63/157,595, filed on Mar. 5, 2021, provisional application No. 62/897,936, filed on Sep. 9, 2019, provisional application No. 62/885,892, filed on Aug. 13, 2019, provisional application No. 62/877,013, filed on Jul. 22, 2019.

(51) Int. Cl.

| | |
|---|---|
| ***G06F 3/0484*** | (2022.01) |
| ***G06F 40/51*** | (2020.01) |
| ***G06F 40/58*** | (2020.01) |
| ***G10L 15/26*** | (2006.01) |

(56) References Cited

U.S. PATENT DOCUMENTS

| | | | | |
|---|---|---|---|---|
| 9,104,661 | B1 * | 8/2015 | Evans | G06F 40/58 |
| 9,137,376 | B1 * | 9/2015 | Basart | H04M 3/56 |
| 9,231,898 | B2 * | 1/2016 | Orsini | G06F 40/40 |
| 9,270,474 | B2 * | 2/2016 | Skaflestad | H04M 3/567 |
| 9,483,461 | B2 * | 11/2016 | Fleizach | G10L 13/033 |
| 9,684,641 | B1 * | 6/2017 | Hamaker | G06F 40/103 |
| 9,959,416 | B1 * | 5/2018 | Ho | G06F 21/40 |
| 10,025,776 | B1 * | 7/2018 | Sjoberg | G06Q 10/0631 |
| 10,318,286 | B2 * | 6/2019 | Velusamy | G06F 8/73 |
| 10,616,278 | B1 * | 4/2020 | Johansson | G06F 40/134 |
| 11,068,669 | B2 * | 7/2021 | Malcangio | G06F 40/40 |
| 2005/0261890 | A1 * | 11/2005 | Robinson | G06F 40/58 704/9 |
| 2008/0132215 | A1 * | 6/2008 | Soderstrom | H04L 67/306 709/204 |
| 2010/0073454 | A1 * | 3/2010 | Lovhaugen | G06F 3/0486 348/E7.083 |
| 2013/0058471 | A1 * | 3/2013 | Garcia | H04M 3/42221 379/202.01 |
| 2013/0191762 | A1 * | 7/2013 | Rajagopalan | G06Q 10/10 715/753 |
| 2014/0222483 | A1 * | 8/2014 | Jaffee | G06Q 10/1095 705/7.19 |
| 2014/0337989 | A1 * | 11/2014 | Orsini | H04L 51/212 726/26 |
| 2015/0092615 | A1 * | 4/2015 | Frankel | H04M 3/563 370/260 |
| 2015/0220888 | A1 * | 8/2015 | Lyer | G06Q 10/1095 705/7.19 |
| 2015/0271341 | A1 * | 9/2015 | Kleiner | H04W 12/068 455/411 |
| 2015/0280963 | A1 * | 10/2015 | Bollapalli | H04L 41/052 709/227 |
| 2016/0234264 | A1 * | 8/2016 | Coffman | H04L 65/4015 |
| 2018/0012191 | A1 * | 1/2018 | Rosenberg | H04L 67/01 |
| 2018/0143974 | A1 * | 5/2018 | Skarbovsky | G06F 40/58 |
| 2018/0314689 | A1 * | 11/2018 | Wang | G10L 15/1822 |
| 2018/0329896 | A1 * | 11/2018 | Goethals | G10L 13/00 |
| 2018/0336900 | A1 * | 11/2018 | Zou | G06F 40/51 |
| 2019/0108492 | A1 * | 4/2019 | Nelson | G06Q 10/1095 |
| 2019/0108834 | A1 * | 4/2019 | Nelson | G06N 5/04 |
| 2019/0273767 | A1 * | 9/2019 | Nelson | H04M 7/0027 |
| 2019/0341050 | A1 * | 11/2019 | Diamant | H04N 7/147 |
| 2019/0341053 | A1 * | 11/2019 | Zhang | G10L 21/0272 |
| 2019/0341055 | A1 * | 11/2019 | Krupka | G10L 25/84 |
| 2020/0143329 | A1 * | 5/2020 | Gamaliel | H04N 21/45455 |
| 2020/0175987 | A1 * | 6/2020 | Thomson | G10L 15/26 |
| 2021/0174787 | A1 * | 6/2021 | Nguyen | G06F 40/169 |

* cited by examiner

SYSTEMS, METHODS, AND APPARATUS FOR SWITCHING BETWEEN AND DISPLAYING TRANSLATED TEXT AND TRANSCRIBED TEXT IN THE ORIGINAL SPOKEN LANGUAGE

CROSS REFERENCE TO RELATED APPLICATIONS

This United States (U.S.) patent application is a continuation in part (CIP) claiming the benefit of U.S. patent application Ser. No. 16/992,489 filed on Aug. 13, 2020, titled SYSTEM AND METHOD USING CLOUD STRUCTURES IN REAL TIME SPEECH AND TRANSLATION INVOLVING MULTIPLE LANGUAGES, CONTEXT SETTING, AND TRANSCRIPTING FEATURES, incorporated by reference for all intents and purposes. U.S. patent application Ser. No. 16/992,489 claims the benefit of U.S. Provisional Patent Application No. 62/877,013, titled SYSTEM AND METHOD USING CLOUD STRUCTURES IN REAL TIME SPEECH AND TRANSLATION INVOLVING MULTIPLE LANGUAGES, filed on Jul. 22, 2019 by inventors Lakshman Rathnam et al.; claims the benefit of U.S. Provisional Patent Application No. 62/885,892, titled SYSTEM AND METHOD USING CLOUD STRUCTURES IN REAL TIME SPEECH AND TRANSLATION INVOLVING MULTIPLE LANGUAGES AND QUALITY ENHANCEMENTS filed on Aug. 13, 2019 by inventors Lakshman Rathnam et al.; and further claims the benefit of U.S. Provisional Patent Application No. 62/897,936, titled SYSTEM AND METHOD USING CLOUD STRUCTURES IN REAL TIME SPEECH AND TRANSLATION INVOLVING MULTIPLE LANGUAGES AND TRANSCRIPTING FEATURES filed on Sep. 9, 2019 by inventors Lakshman Rathnam et al., all of which are incorporated herein by reference in their entirety, for all intents and purposes.

This United States (U.S.) patent application further claims the benefit of U.S. provisional patent application No. 63/157,595 filed on Apr. 5, 2021, titled SYSTEM AND METHOD OF TRANSFORMING TRANSLATED AND DISPLAYED TEXT INTO TEXT DISPLAYED IN THE ORIGINALLY SPOKEN LANGUAGE, incorporated by reference for all intents and purposes. This United States (U.S.) patent application further incorporates by reference U.S. provisional patent application No. 63/163,981 filed on Mar. 22, 2021, titled SYSTEM AND METHOD OF NOTIFYING A TRANSLATION SYSTEM OF CHANGES IN SPOKEN LANGUAGE for all intents and purposes. This United States (U.S.) patent application further incorporates by reference U.S. provisional patent application No. 63/192,264 filed on May 24, 2021, titled DETERMINING SPEAKER LANGUAGE FROM TRANSCRIPTS OF PRESENTATION for all intents and purposes.

FIELD OF THE INVENTION

This disclosure is generally related to transcription and language translation of spoken content.

BACKGROUND

Globalization has led to large companies to have employees in many different countries. Large business entities, law, consulting, and accounting firms, and non-governmental (NGO) organizations are now global in scope and have physical presences in many countries. Persons affiliated with these institutions may speak many languages and must communicate with each other regularly with confidential information exchanged. Conferences and meetings involving many participants are routine and may involve persons speaking and exchanging material in multiple languages.

Translation technology currently provides primarily bilateral language translation. Translation is often disjointed and inaccurate. Translation results are often awkward and lacking context. Idiomatic expressions are not handled well. Internal jargon common to organizations, professions, and industries often cannot be recognized or translated. Accordingly, translated transcripts of text in a foreign language can often clunky and unwieldy. Such poor translations of text are therefore of less value to active participants in a meeting and parties that subsequently read the translated transcripts of such meeting.

SUMMARY

The invention is best summarized by the claims that follow below. However, briefly systems and methods are disclosed of simultaneously transcribing and translating, via cloud-based technology, spoken content in one language into many languages, providing the translated content in both audio and text format, and adjusting the translation for context of the interaction between participants. The translated transcripts can be annotated, summarized, and tagged for future commenting and correction. The attendee user interface displays speech bubbles on a display device or monitor. The speech bubbles can be selected to show text in the language being spoken by a speaker in different ways.

BRIEF DESCRIPTION OF THE DRAWINGS

FIGS. 3A-3D are conceptual diagrams of capturing spoken words (speech) in a first language, generating transcripts, translating transcripts, and generating spoken words (speech) in a second language that a participant can listen to.

DETAILED DESCRIPTION

Figure 1A:
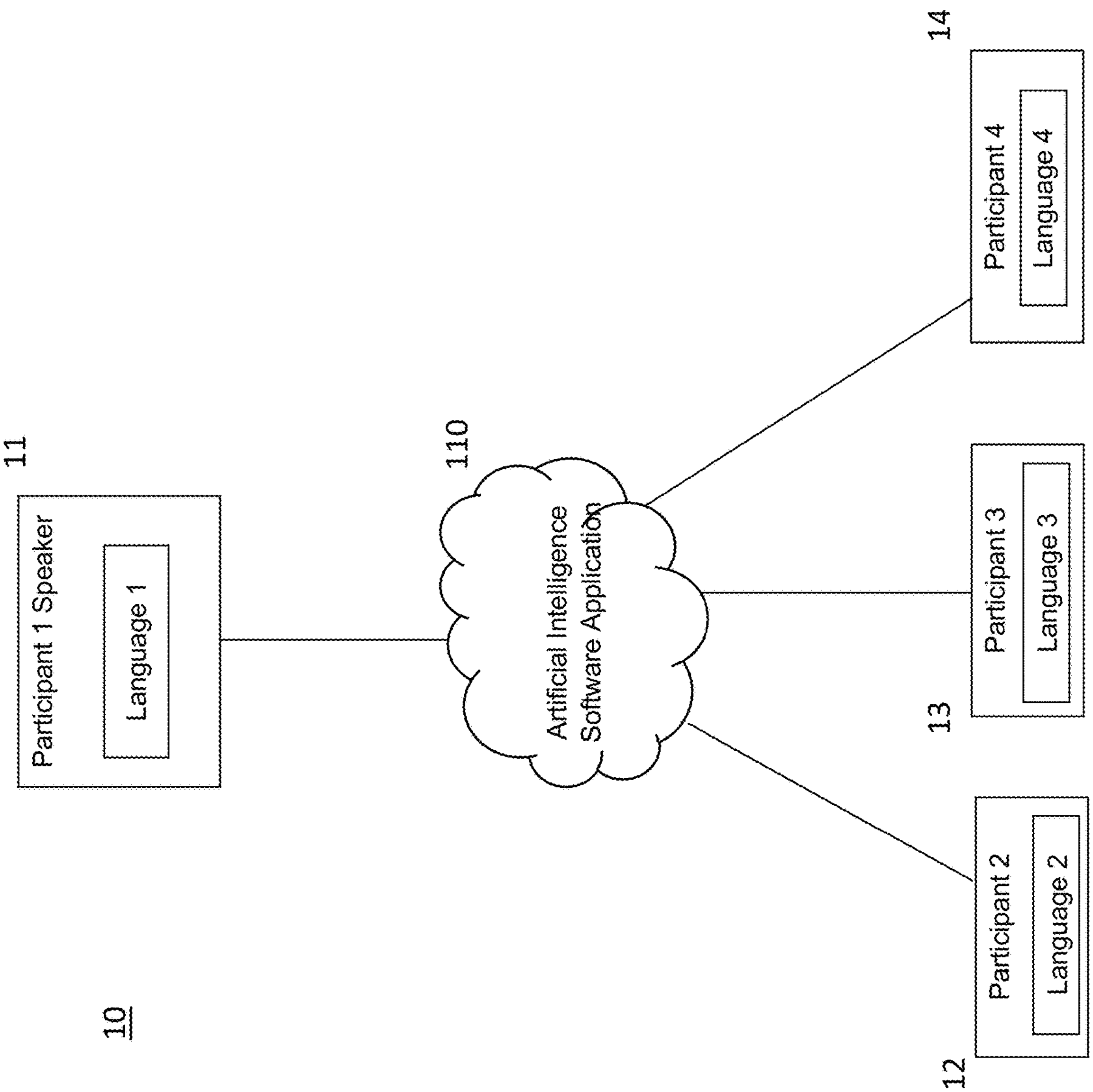
FIG. 1A is a block diagram of a system of using a cloud structure in real time speech transcription and translation involving a plurality of participants some of which can speak and read a different language from others.

In the following detailed description of the disclosed embodiments, numerous specific details are set forth in order to provide a thorough understanding. However, it will be obvious to one skilled in the art that the disclosed embodiments may be practiced without these specific details. In other instances, well known methods, procedures, components, and subsystems have not been described in detail so as not to unnecessarily obscure aspects of the disclosed embodiments.

The embodiments disclosed herein includes methods, apparatus, and systems for near instantaneous translation of spoken voice content in many languages in settings involving multiple participants, themselves often speaking many different languages. A voice translation can be accompanied by a text transcription of the spoken content. As a participant hears the speaker's words in the language of the participant's choice, text of the spoken content is displayed on the participant's viewing screen in the language of the participant's choice. In an embodiment, the text may be simultaneously displayed for the participant in both the speaker's own language and in the language of the participant's choice.

Features are also provided herein that may enable participants to access a transcript as it is being dynamically created while presenters or speakers are speaking. Participants may provide contributions including summaries, annotations, and highlighting to provide context and broaden the overall value of the transcript and conference. Participants may also selectively submit corrections to material recorded in transcripts. Nonverbal sounds occurring during a conference are additionally identified and added to the transcript to provide further context.

A participant chooses the language he or she wishes to hear and view transcriptions, independent of a language the presenter has chosen for speaking. Many parties, both presenters and participants, can participate using various languages. Many languages may be accommodated simultaneously in a single group conversation. Participants can use their own chosen electronic devices without having to install specialized software.

The systems and methods disclosed herein use advanced natural language processing (NLP) and artificial intelligence to perform transcription and language translation. The speaker speaks in his/her chosen language into a microphone connected to a device using iOS, Android, or other operating system. The speaker's device and/or a server (e.g., server device) executes an application with the functionally described herein. Software associated with the application transmits the speech to a cloud platform.

The transcribing and translating system is an on-demand system. That is, as a presentation or meeting is progressing, a new participant can join the meeting in progress. The cloud platform includes at least one server (e.g., server device) that can start up transcribing engines and transcription engines on demand. Artificial intelligence (natural language processing) associated with the server software translates the speech into many different languages. The server software provides the transcript services and translation services described herein.

Participants join the session using an attendee application provided herein. Attendees select their desired language to read text and listen to audio. Listening attendees receive translated text and translation audio of the speech as well as transcript access support services in near real time in their own selected language.

Functionality is further provided that may significantly enhance the quality of translation and therefore the participant experience and overall value of the conference or meeting. Intelligent back end systems may improve translation and transcription by selectively using multiple translation engines, in some cases simultaneously, to produce a desired result. Translation engines are commercially available, accessible on a cloud-provided basis, and be selectively drawn upon to contribute. The system may use two or more translation engines simultaneously depending upon one or more factors. These one or more factors can include the languages of speakers and attendees, the subject matter of the discussion, the voice characteristics, demonstrated listening abilities and attention levels of participants, and technical quality of transmission. The system may select one or two or more translation engines for use. One translation engine may function as a primary source of translation while a second translation engine is brought in as a supplementary source to confirm translation produced by the first engine. Alternatively, a second translation engine may be brought in when the first translation engine encounters difficulty. In other embodiments, two or more translation engines can simultaneously be used to perform full translation of the different languages into which transcribed text is to be translated and audible content generated.

Functionality provided herein that executes in the cloud, on the server, and/or on the speaker's device may instantaneously determine which translation and transcript version are more accurate and appropriate at any given point in the session. The system may toggle between the multiple translation engines in use in producing the best possible result for speakers and participants based on their selected languages and the other factors listed above as well as their transcript needs.

A model may effectively be built of translation based on the specific factors mentioned above as well as number and location of participants and complexity and confidentiality of subject matter and further based on strengths and weaknesses of available translation engines. The model may be built and adjusted on a sentence by sentence basis and may dynamically choose which translation engine or combination thereof to use.

Context may be established and dynamically adjusted as a meeting session proceeds. Context of captured and translated material may be carried across speakers and languages and from one sentence to the next. This action may improve quality of translation, support continuity of a passage, and provide greater value, especially to participants not speaking the language of a presenter.

Individual portions (e.g., sentences) of captured speech are not analyzed and translated in isolation from one another but instead in context of what has been said previously. As noted, carrying of context may occur across speakers such that during a session, for example a panel discussion or conference call, context may be carried forward, broadened out, and refined based on the spoken contribution of multiple speakers. The system may blend the context of each speaker's content into a single group context such that a composite context is produced of broader value to all participants.

A glossary of terms may be developed during a session or after a session. The glossary may draw upon a previously created glossary of terms. The system may adaptively change a glossary during a session. The system may detect and extract key terms and keywords from spoken content to build and adjust the glossary.

The glossary and contexts developed may incorporate preferred interpretations of some proprietary or unique terms and spoken phrases and passages. These may be created and relied upon in developing context, creating transcripts, and performing translations for various audiences. Organizations commonly create and use acronyms and other terms to facilitate and expedite internal communications. Glossaries for specific participants, groups, and organizations could therefore be built, stored and drawn upon as needed.

Services are provided for building transcripts as a session is ongoing and afterward. Transcripts are created and can be continuously refined during the session. Transcript text is displayed on monitors of parties in their chosen languages. Transcript text of the session can be finalized after the session has ended.

The transcript may rely on previously developed glossaries. In an embodiment, a first transcript of a conference may use a glossary appropriate for internal use within an organization, and a second transcript of the same conference may use a general glossary more suited for public viewers of the transcript.

Systems and methods also provide for non-verbal sounds to be identified, captured, and highlighted in transcripts. Laughter and applause, for example, may be identified by the system and highlighted in a transcript, providing further context.

In an embodiment, a system for using cloud structures in real time speech and translation involving multiple languages is provided. The system comprises a processor (e.g., processor device), a memory (e.g., memory device or other type of storage device), and an application stored in the memory that when executed on the processor receives audio content in a first spoken language from a first speaking device. The system also receives a first language preference from a first client device, the first language preference differing from the spoken language. The system also receives a second language preference from a second client device, the second language preference differing from the spoken language. The system also transmits the audio content and the language preferences to at least one translation engine. The system also receives the audio content from the engine translated into the first and second languages and sends the audio content to the client devices translated into their respective preferred languages.

The application selectively blends translated content provided by the first translation engine with translated content provided by the second translation engine. It blends such translated content based on factors comprising at least one of the first spoken language and the first and second language preferences, subject matter of the content, voice characteristics of the spoken audio content, demonstrated listening abilities and attention levels of users of the first and second client devices, and technical quality of transmission. The application dynamically builds a model of translation based at least upon one of the preceding factors, based upon locations of users of the client devices, and based upon observed attributes of the translation engines.

In another embodiment, a method for using cloud structures in real time speech and translation involving multiple languages. The method comprises a computer receiving a first portion of audio content spoken in a first language. The method also comprises the computer receiving a second portion of audio content spoken in a second language, the second portion spoken after the first portion. The method also comprises the computer receiving a first translation of the first portion into a third language. The method also comprises the computer establishing a context based on at least the first translation. The method also comprises the computer receiving a second translation of the second portion into the third language. The method also comprises the computer adjusting the context based on at least the second translation.

Actions of establishing and adjusting the context are based on factors comprising at least one of subject matter of the first and second portions, settings in which the portions are spoken, audiences of the portions including at least one client device requesting translation into the third language, and cultural considerations of users of the at least one client device. The factors further include cultural and linguistic nuances associated with translation of the first language to the third language and translation of the second language to the third language.

In yet another embodiment, a system for using cloud structures in real time speech and translation involving multiple languages and transcript development is provided. The system comprises a processor, a memory, and an application stored in the memory that when executed on the processor receives audio content comprising human speech spoken in a first language. The system also translates the content into a second language and displays the translated content in a transcript displayed on a client device viewable by a user speaking the second language.

The system also receives at least one tag in the translated content placed by the client device, the tag associated with a portion of the content. The system also receives commentary associated with the tag, the commentary alleging an error in the portion of the content. The error may allege concerns at least one of translation, contextual issues, and idiomatic issues. The system also corrects the portion of the content in the transcript in accordance with the commentary. The application verifies the commentary prior to correcting the portion in the transcript.

Referring now to FIG. 1A, a block diagram of a transcribing and translating system 10 is shown with four participants 11-14 in communication with a cloud structure 110. Each of the four participants can speak a different language (language 1 through language 4) or one or more can speak the same language while a few speak a different language. A first participant 11 is a speaker while the other three participants 12-14 are listeners. If a different participant speaks, the other three participants become listeners. That is, each participant can both be a speaker and a listener. For ease in explanation, we consider the first participant to be the speaker and the other participants listeners. The plurality of participants are part of a group in a meeting or conference to communicate with each other. Some or all of the participants can participate locally or some or all can participate remotely as part of the group.

A very low latency by the software application to deliver voice transcription and language translation enables conferences to progress naturally, as if attendees are together in a single venue. The transcription and translation are near instantaneous. Once a speaker finishes a sentence, it is translated. The translation may introduce a slight, and in many cases imperceptible, delay before a listener can hear the sentence in his/her desired language with text to speech conversion. Furthermore, speaking by a speaker often occurs faster than a recipient can read the translated transcript of that speech in his/her desired language. Because of lag effects associated with waiting until a sentence is finished before it can be translated and presented in the chosen language of a listening participant, the speed of the speech as heard by the listener in his/her desired language may be sped up slightly so it seems synchronized. The speed of text to speech conversion is therefore adaptive for better intelligibility and user experience. The speed of speech may be adjusted in either direction (faster or slower) to adjust for normalcy and the tenor of the interaction. The speaking rate can be adjusted for additional reasons. A "computer voice" used in the text to speech conversion may naturally speak faster or slower than the presenter. The translation of a sentence may include more or fewer words to be spoken than in the original speech of the speaker. In any case, the system ensures that the listener does not fall behind because of these effects.

The system can provide quality control and assurance. The system monitors the audio level and audio signals for intelligibility of input. If the audio content is too loud or too soft, the system can generate a visual or audible prompt to the speaker in order to change his/her speaking volume or other aspect of interaction with his/her client electronic device, such as a distance from a microphone. The system is also configured to identify audio that is not intelligible, is spoken in the wrong language, or is overly accented. The system may use heuristics or rules of thumb that have been discovered to be successful in the past of maintaining quality. The heuristics can prove sufficient to reach an immediate goal of an acceptable transcription and translations thereof. Heuristics may be generated based on confidence levels on interactive returns of a speaker's previous spoken verbiage.

The cloud structure 110 provides real time speech transcription and translation involving multiple languages according to an embodiment of the present disclosure. FIG. 1A depicts the cloud structure 110 having at least one software application with artificial intelligence being executed to perform speech transcription and language translation. When participant 1, the speaker, speaks in his/her chosen language, language 1, it is transcribed and translated in the cloud for the benefit of the other participants 12-14 into the selected language (language 2 through language 4) of those participants so they can read the translated words and sentences associated with the language 1 of the spoken speech of participant 1.

Figure 1B:
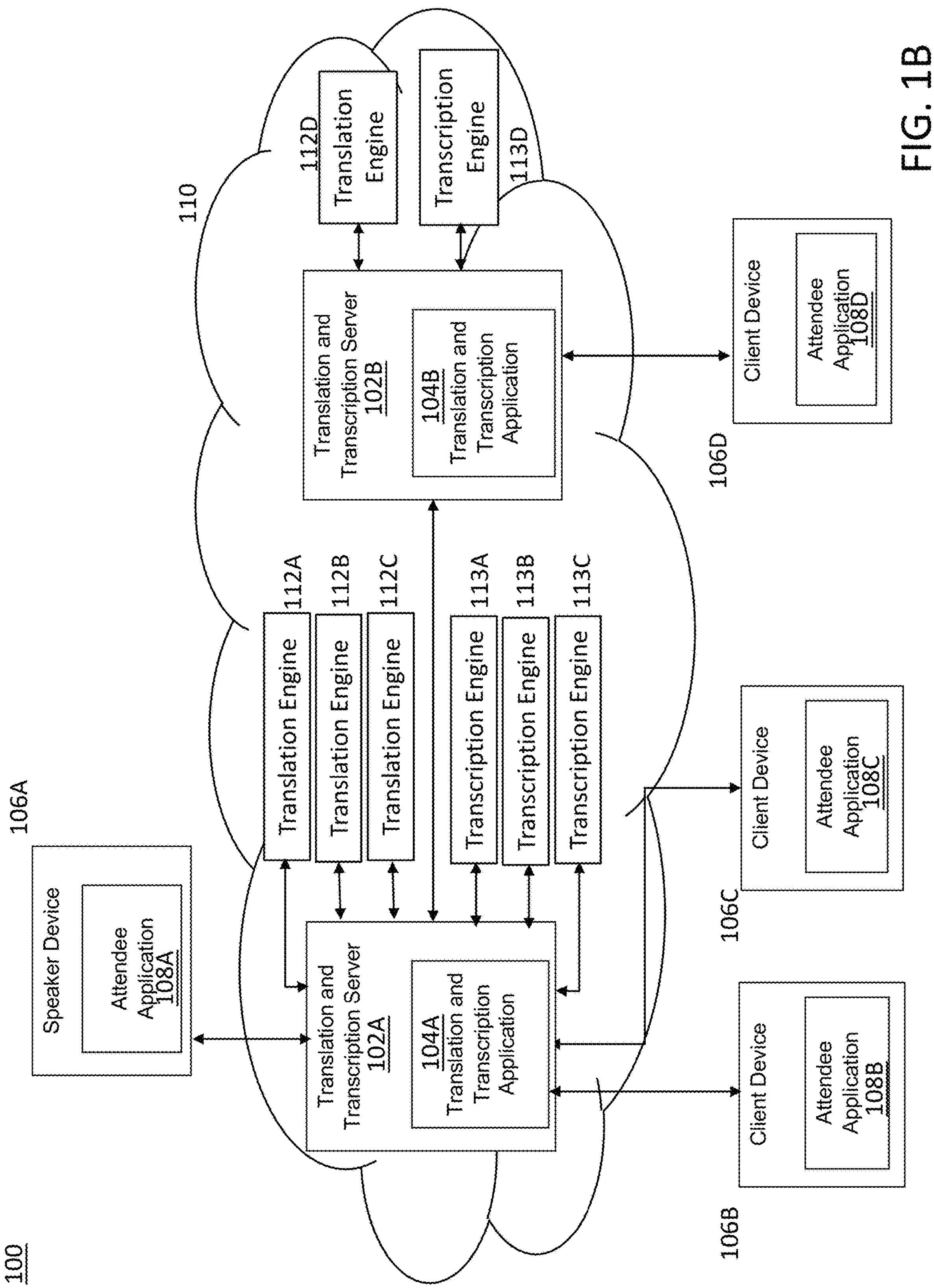
FIG. 1B is a block diagram of a client-server system of using a cloud structure to provide real time speech transcription and translation into multiple languages.

Referring now to FIG. 1B, a block diagram of a transcribing and translating system 100 is shown using cloud structures 110 in real time speech and translation involving multiple languages, context setting, and transcript development features in accordance with an embodiment of the present disclosure. The transcribing and translating system 100 uses advanced natural language processing (NLP) with artificial intelligence to perform transcription and translation.

FIG. 1B depicts components and interactions of the clients and the one or more servers of the system 100. In a cloud structure 110, one or more servers 102A-102B can be physical or virtual with the physical processors located anywhere in the world. One server 102A may be geographically located to better serve the electronic client devices 106A-160C while the server 102B may be geographically located to better serve the electronic client device 106D. In this case the servers 102A-102B are coupled in communication together to support the conference or meeting between the electronic devices 106A-106D.

The system 100 includes one or more translation and transcription servers 102A-102B executing one or more copies of the translation and transcription application 104A-104B. For brevity, the translation and transcription server 102A-102B can simply be referred to herein as the server 102 and the translation and transcription application 104A-104B can be simply referred to as the application 104. The server 102 executes the application 104 to provide much of the functionality described herein.

The system 100 further includes a client devices 106A-106D with one referred to as a speaker (host) device 106A and others as listener (attendee) client devices 106B-106D. These components can be identical as the speaker device 106A and client devices 106B-106D may be interchangeable as the roles of their users change during a meeting or conference. A user of the speaker device 106A may be a speaker (host) or conference leader on one day and on another day may be an ordinary attendee (listener). The roles of the users can also change during the progress of meeting or conference. For example, the device 106B can become the speaker device while the device 160A can become a listener client device. The speaker device 106A and client devices 106B-160D have different names to distinguish their users but their physical makeup may be the same, such as a mobile device or desktop computer with hardware functionality to perform the tasks described herein.

The system 100 also includes the attendee application 108A-108D that executes on the speaker device 106A and client devices 106B-106D. As speaker and participant roles may be interchangeable from one day to the next as described briefly above, the software executing on the speaker device 106A and client devices 106B-106D is the same or similar depending on whether a person is a speaker or participant. When executed by the devices 106A-160D, the attendee application 108A-108D can provide the further functionality described herein (e.g., a graphical user interface).

On-Demand System

The transcribing and translating system 100 is an on-demand system. In the cloud 110, the system 100 includes a plurality of computing resources including computing power with physical resources widely dispersed and with on-demand availability. As a presentation or meeting is progressing, a new participant can join the presentation or meeting in progress and obtain transcription and translation on demand in his or her desired language. The system 100 does not need advanced knowledge of the language spoken or the user desired languages into which the translation is to occur. The cloud platform includes at least one server that can start up transcribing engines and transcription engines on demand. As shown in FIG. 1B, the cloud 110 includes translation engines 112A-112D and transcription engines 113A-113D that can be drawn upon by the server application 104A,104B and the attendee applications 108A-108D executing on the client devices 106A-106D. The system can start up a plurality of transcription engines 113A-113D and translation engines 112A-112D upon demand by the participants as they join a meeting.

Typically, one transcription engine 113A-113D per participant is started up as shown. If each participant speaks a different language, then typically, one translation engine 113A-113D per participant is started up as shown. The translation engine adapts to the input language that is currently being spoken and transcribed. If another person speaks a different language, the translation adapts to the different input language to maintain the same output language desired by the given participant.

Client-Server Devices

Figure 1D:
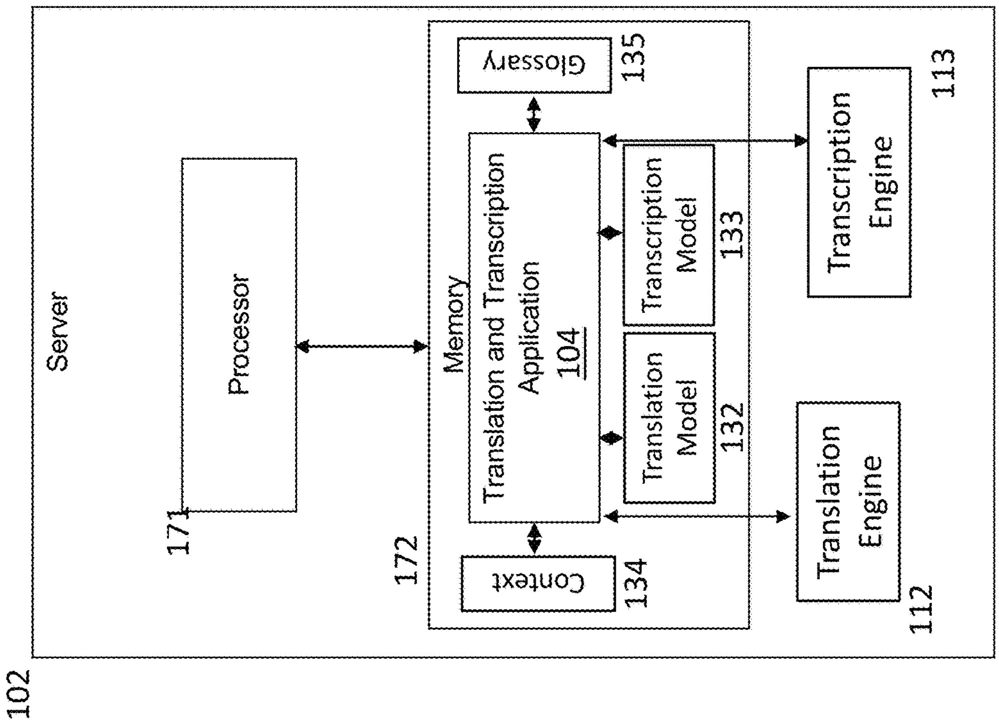
FIG. 1D is a block diagram of a server system device.
Figure 1C:
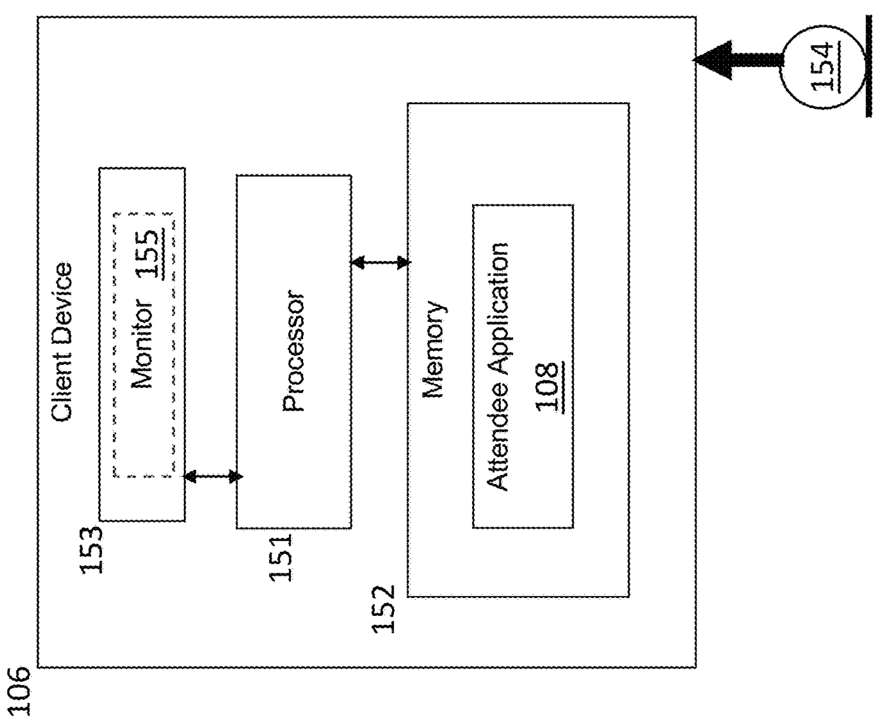
FIG. 1C is a block diagram of a client device.

Referring now to FIG. 1C, an instance of a client electronic device 106 for the client electronic devices 106A-106D shown in FIG. 1B. The client electronic device may be a mobile device, tablet, or laptop or desktop computer. The electronic device includes a processor 151 and a memory 151 (e.g., memory device or other type of storage device) coupled to the processor 151. The processor 151 executes the operating system (OS) and the attendee application 108.

The speaker speaks in his/her chosen language into a microphone 154 connected to the client device 106. The client device 106 executes the attendee application 108 to process the spoken speech into the microphone into audio content. The client electronic device 106 further includes a monitor 153 or other type of viewing screen to display the translated transcript text of the speech in their chosen language. The translated transcript text of the speech may be displayed within a graphical user interface (GUI) 155 displayed by the monitor 153 of the electronic device 150.

Referring now to FIG. 1D, an instance of a server system 102 for the one or more servers 102A-102B is shown in FIG. 1B. The server system 102 comprises a processor 171, and a memory 172 or other type of data storage device coupled to the processor 171. The translation and transcription application 104 is stored in the memory 172 and executed by the processor 171. The translation and transcription application 104 can start up one or more transcription engines 113 in order to transcribe one or more speaker's spoken words and sentences (speech) in their native language and can start up one or more translation engines 112 translate the transcription into one or more foreign languages of readers and listeners of a text to speech service.

Models

A translation model 132 and a transcription model 133 are dynamically built by the translation and transcription application 104 and can be stored in the memory 172. The translation model 132 and the transcription model 133 are for the specific meeting session of services provided to the participants shown by FIGS. 3A-3E. The translation model (model of translation) 132 and the transcription model 133 can be based on the locations of users of the client devices, and on observed attributes of the translation engines and the transcription engines (e.g., selected reader/listener languages, spoken languages, and translations made between languages). Additional factors that can used by the models are at least one of the first spoken language and the first and second language preferences, the subject matter of the content of speech/transcription (complexity, confidentiality), voice characteristics of the spoken audio content, demonstrated listening abilities and attention levels of users of the first and second client devices, technical quality of transmission, and strengths and weaknesses of the transcription and translation engines. The models are dynamic in that they adapt as participants add and/or drop out of the meeting, as different languages are spoken or selected to provide different services, and as other factors change. The models can be built and adjusted on a sentence by sentence basis. The models can dynamically choose which translation and transcription engines to use in order to support the meeting and the participants. In other words, these are models of the system that can learn as the meeting is started and as the meeting progresses.

Context and Glossaries

The context of spoken content in a meeting, that clarifies meaning, can be established from the first few sentences that are spoken and translated. The context can be established from what is being spoken as well as the environment and settings in which the speaker is speaking. The context can be established from one or more of the subject matters being discussed, the settings in which the sentences or other parts are spoken, the audience to which the sentences are being spoken (e.g., the requests for translations into other languages on client devices) and cultural considerations of the users of the client devices. Further context can be gathered from the cultural and linguistic nuances associated with the translations between the languages.

The context can be dynamically adjusted as a meeting session proceeds. The context of the captured, transcribed, and translated material can be carried across speakers, languages, and from one sentence to the next. This action of carrying the context can improve the quality of a translation, support the continuity of a passage, and provide greater value, especially to listening participants that do not speak or understand the language of a presenter/speaker.

As discussed herein, individual portions (e.g., sentences, words, phrases) of captured and transcribed speech are not analyzed and translated in isolation from one another. Instead, the transcribed speech is translated in the context of what has been said previously. As noted, the carrying of the context of speeches may occur across speakers during a meeting session. For example, consider a panel discussion or conference call where multiple speakers often make speeches or presentations. The context, the meaning of the spoken content, may be carried forward, broadened out, and refined based on the spoken contribution of the multiple speakers. The system can blend the context of each speaker's content into a single group context such that a composite context is produced of broader value to all participants. The one or more types of context 134 can be stored in memory 172 or other storage device that can be readily updated.

For a meeting session, the system can build one or more glossaries 135 of terms for specific participants, groups, and organizations that can be stored in memory 172 or other storage device of a server 120 as is shown in FIG. 1D. Organizations commonly create and use acronyms and other terms to facilitate and expedite internal communications. Glossaries of these terms for specific participants, groups, and organizations could therefore be built, stored and drawn upon as needed. The system can detect and extract key terms and keywords from spoken content to build and adjust the glossaries.

A glossary of terms may be developed during a session or after a session. The glossary may draw upon a previously created glossary of terms. The system may adaptively change a glossary during a session.

The glossaries 135 and contexts 134 developed may incorporate preferred interpretations of some proprietary or unique terms and spoken phrases and passages. These may be created and relied upon in developing context, creating transcripts, and performing translations for various audiences.

The transcript may rely on previously developed glossaries. In an embodiment, a first transcript of a conference may use a glossary (private glossary) appropriate for internal use within an organization. A second transcript of the same conference may use a general glossary (public glossary) more suited for public viewers of the transcript of the conference.

Services

Referring now to FIGS. 3A-3D, a speaker speaks in his/her chosen language (e.g., language 1) into a microphone 154 connected to the device 150. The microphone device 154 forms audio content (e.g., speech signal) from the spoken language. The audio content spoken in the first language (language 1) is sent to the server 102 in the cloud 110.

The server 102 in the cloud provides a transcription service converting the speech signal from a speaker into transcribed words of a first language. A first transcription engine 113A may be called to transcribe the first attendee (speaker) associated with the electronic device 106A. If other attendees speak, additional transcription engines 113B-113D may be called up by the one or more servers and used to transcribe their respective speech from their devices 106B-106C in their respective languages.

For the client device 106B, the server 102 in the cloud further provides a translation service by a first translation engine 112A to convert the transcribed words in the first language into transcribed words of a second language differing from the first language. Additional server translation engines 112B-112C can be called on demand, if different languages are requested by other attendees at their respective devices 106C-106D of the group meeting. If a plurality of client devices 106B-106C request the same language translation of the transcript, only one translation engine need be called into service by the server and used to translate the speaker transcript. The translated transcript in the second language can be displayed on a monitor M.

Figures 3A, 3B, 3C, 3D:
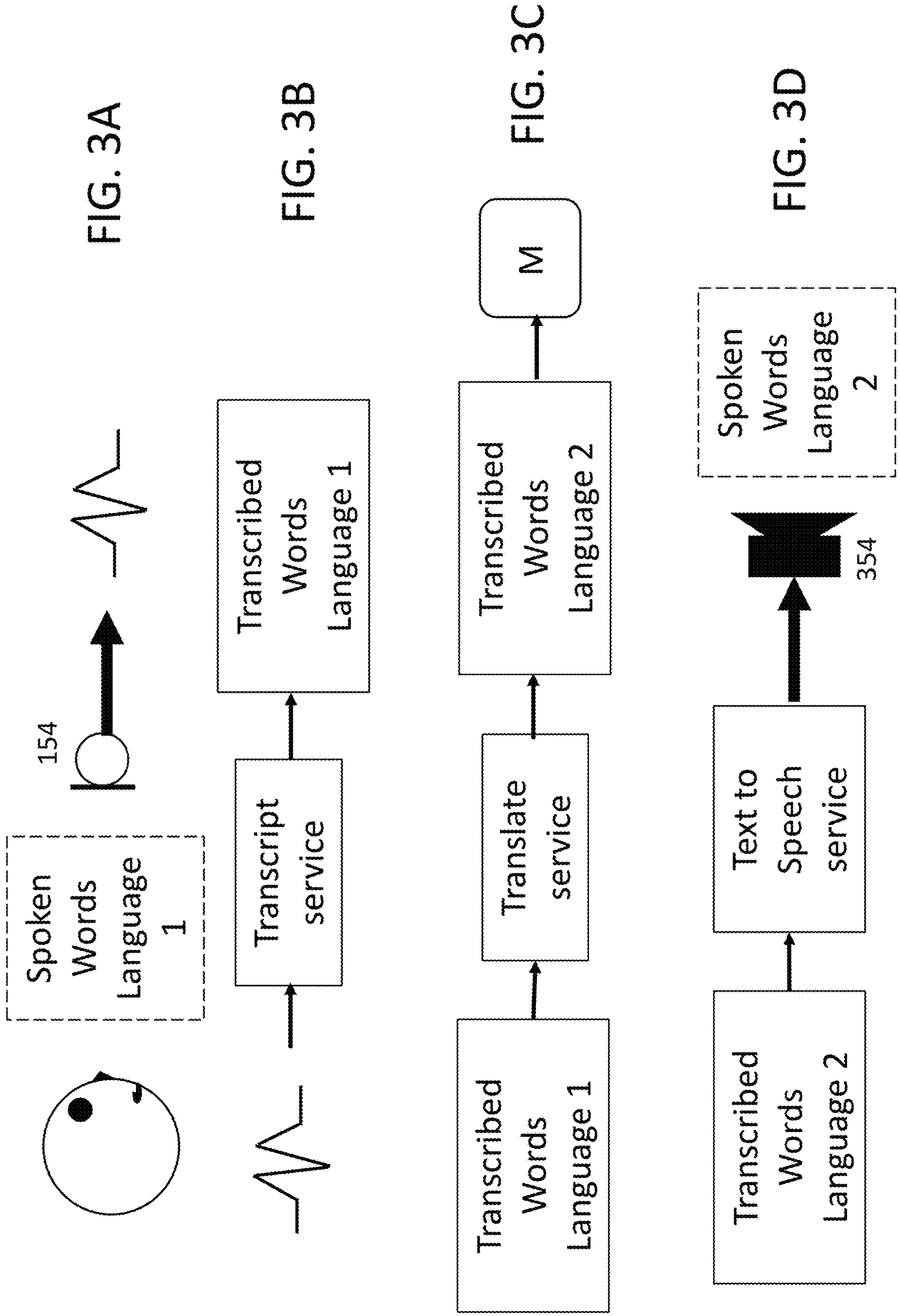

In FIG. 3D, an attendee may desire to listen to the translated transcript in the second language as well. In which case, a text to speech service can be used with the translated transcribed words in the second language to provide a speech signal. The speech signal can drive a loudspeaker 354 to generate spoken words from the translated transcript in the second language. In some embodiments a client electronic device 106 with a loudspeaker can provide the text to speech service and generate a speech signal. In other embodiments, the server 102 can call up a text to speech engine with a text to speech service and generate a speech signal for the loudspeaker 354 of a client electronic device 106.

Figure 3E:
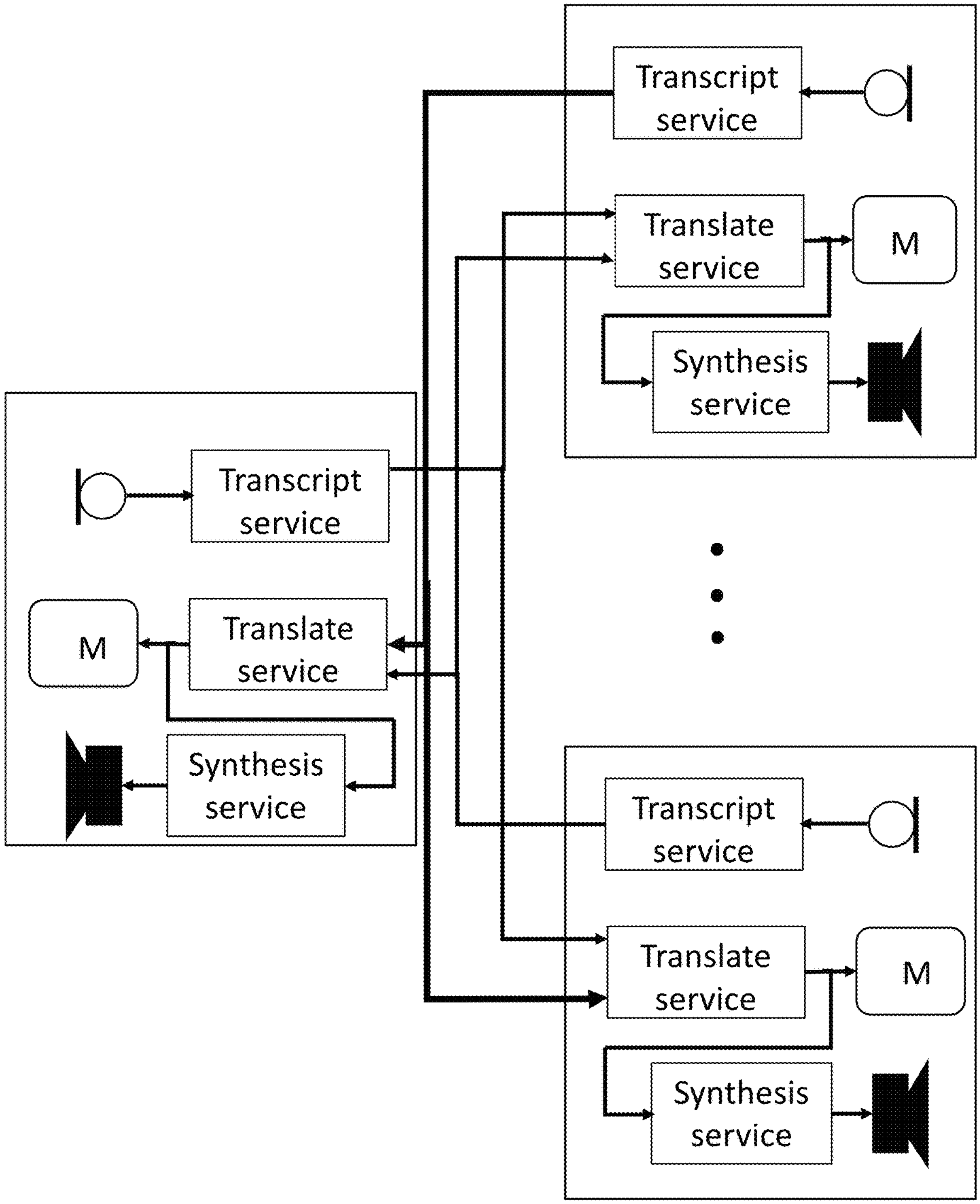
FIG. 3E is a block diagram depiction of the services provided to the multiple participants in a conference meeting.

Referring now to FIG. 3E, a block diagram is shown on the services being provided by the client server system to each attendee in a group meeting. The services allow each attendee to communicate in their own respective language in the group meeting with the other attendees that may understand different languages. Each attendee may have their own transcript service to transcribe their audio content into text of their selected language. Each attendee may have their own translate service to translate the transcribed text of others into their selected language so that it can be displayed on a monitor M and read by the respective attendee in their selected language. Each attendee may have their own text to speech (synthesis) service to convert the translated transcribed text in their selected language into audio content that it can be played by a loudspeaker and listened to by the respective attendee in their selected language.

Figure 4:
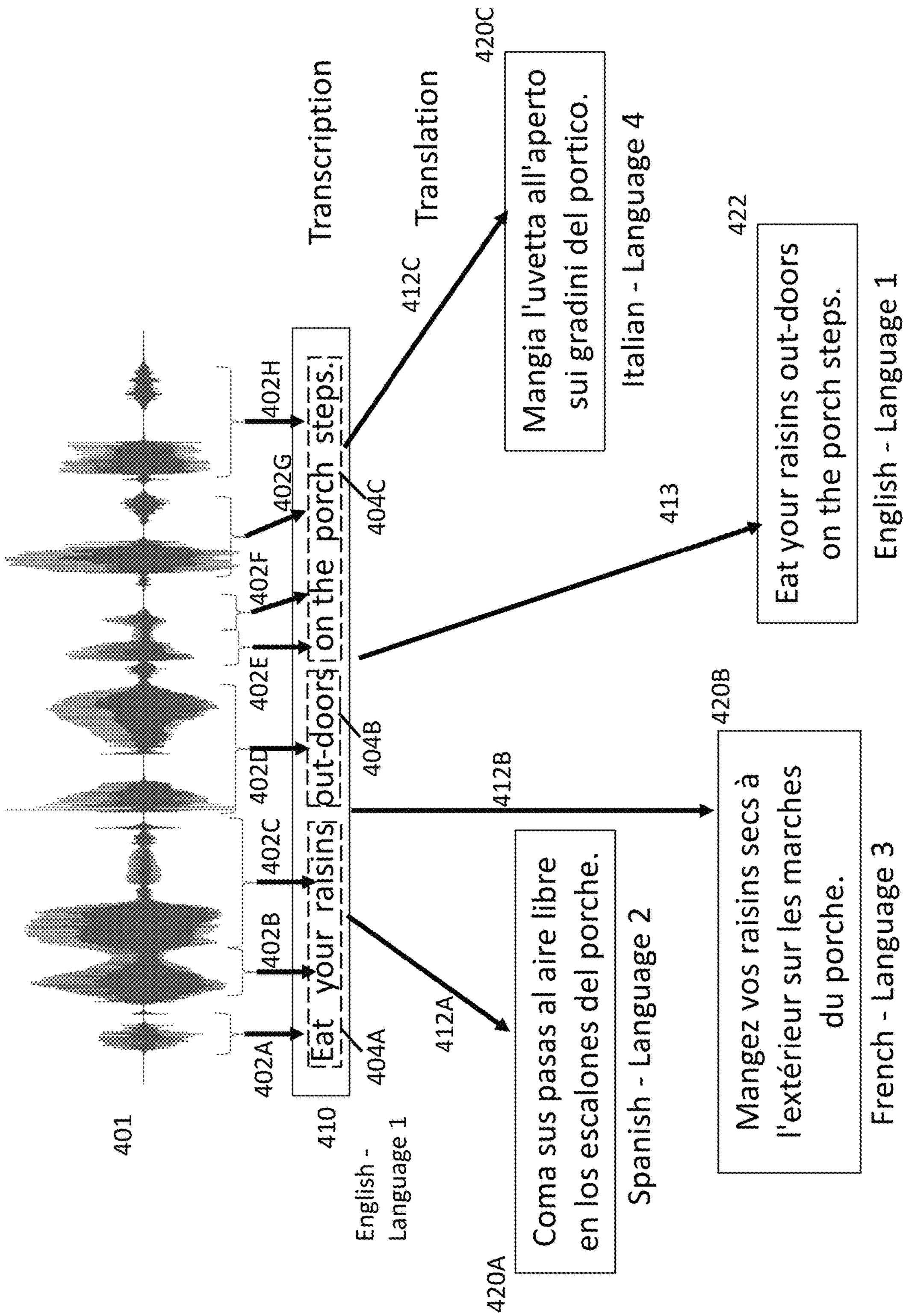
FIG. 4 is a conceptual diagram of language transcription and multi-language translation of spoken content.

Referring now to FIG. 4, a conceptual diagram of the transformation process by the system is shown. The spoken content in a meeting conference is transformed into a transcription of text and then undergoes multi-language translation into a plurality of transcriptions in different languages representing the spoken content.

The audio content 401 is spoken in a first language, such as English. While speech recognition applications typically works word by word, voice transcription of speech into a text format works on more than one word at a time, such as phrases, based on the context of the meeting. For example, speech to text recognizes the portions 402A-402 of the audio content 401 as each respective word of the sentence, Eat your raisins out-doors on the porch steps. However, transcription works on converting the words into proper phrases of text based on context. For example, the phrase 404A of words Eat your raisins is transcribed first, the phrase 404B out-doors is transcribed, and the phrase 404C on the porch steps is transcribed into text. The entire sentence is checked for proper grammar and sentence structure. Corrections are made as needed and the text of the sentence is fully transcribed for display on one or more monitors M that desire to read the first language English. For example, participants that selected the first language English to read would directly 413, without language translation, each have a monitor or display device to display a speech bubble 410 with the sentence "Eat your raisins out-doors on the porch steps". However, participants that selected a different language to read need further processing of the audio content 401 that was transcribed into a sentence of text in the first language, such as English.

A plurality of translations 412A-412C of the first language (English) transcript are made for a plurality of participants that want to read a plurality of different languages (e.g., Spanish, French, Italian) that differ from the first language (e.g., English) that was spoken by the first participant/speaker. A first translation 412A of the first transcript the first language into the second language generates a second transcript 420A of text in the second language. Assuming Spanish was selected to be read, a monitor or display device displays a speech bubble 420A of the sentence of translated transcribed text such as "Coma sus pasas al aire libre en los escalones del porche". Simultaneously for another participant, translation 412B of the first transcript in the first language into a third language generates a third transcript 420B of text in the third language. Assuming French was selected to be read, a monitor or display device displays a speech bubble 420B of the sentence of translated transcribed text such as "Mangez vos raisins secs à l+extérieur sur les marches du porche". Simultaneously for another participant, translation 412C of the first transcript in the first language into a fourth language generates a fourth transcript 420C of text in the fourth language. Assuming Italian was selected to be read, a monitor or display device displays a speech bubble 420C of the sentence of translated transcribed text such as "Mangia l'uvetta all'aperto sui gradini del portico".

Once a speaking participant finishes speaking a sentence and it is transcribed into text of his/her native language, then it is translated into the other languages that are selected by the participants. That is, translation from one language to another works on an entire sentence at a time based on the context of the meeting. Only if a sentence is very long, does the translation process chunk a sentence into multiple phrases of a plurality of words and separately translate the multiple phrases.

Other participants may speak and use a different language that that of the first language. For example, the participant that selected the second language, such as Spanish, may speak. This audio content 401 is spoken in the second language. Speech to text recognizes the portions 402A-402 of the audio content 401 as each respective word of the sentence and is transcribed into the second language. The other participants will then desire translations from the text of the second language into text of their respective selected languages. The system adapts to the user that is speaking and makes translations for those that are listening in different languages. Assuming each participant selects a different language to read, each translation engine 112A-112D shown in FIG. 1B adapts to the plurality (e.g., three) of languages that can be spoken to translate the original transcription from and into their respective selected language for reading.

With a translated transcript of text, each participant may choose to hear the sentence in the speech bubble in their selected language. A text to speech service can generate the audio content. The audio content can then be processed to drive a loudspeaker so the translation of the transcript can be listened to as well.

Graphical User Interfaces

Figure 5A:
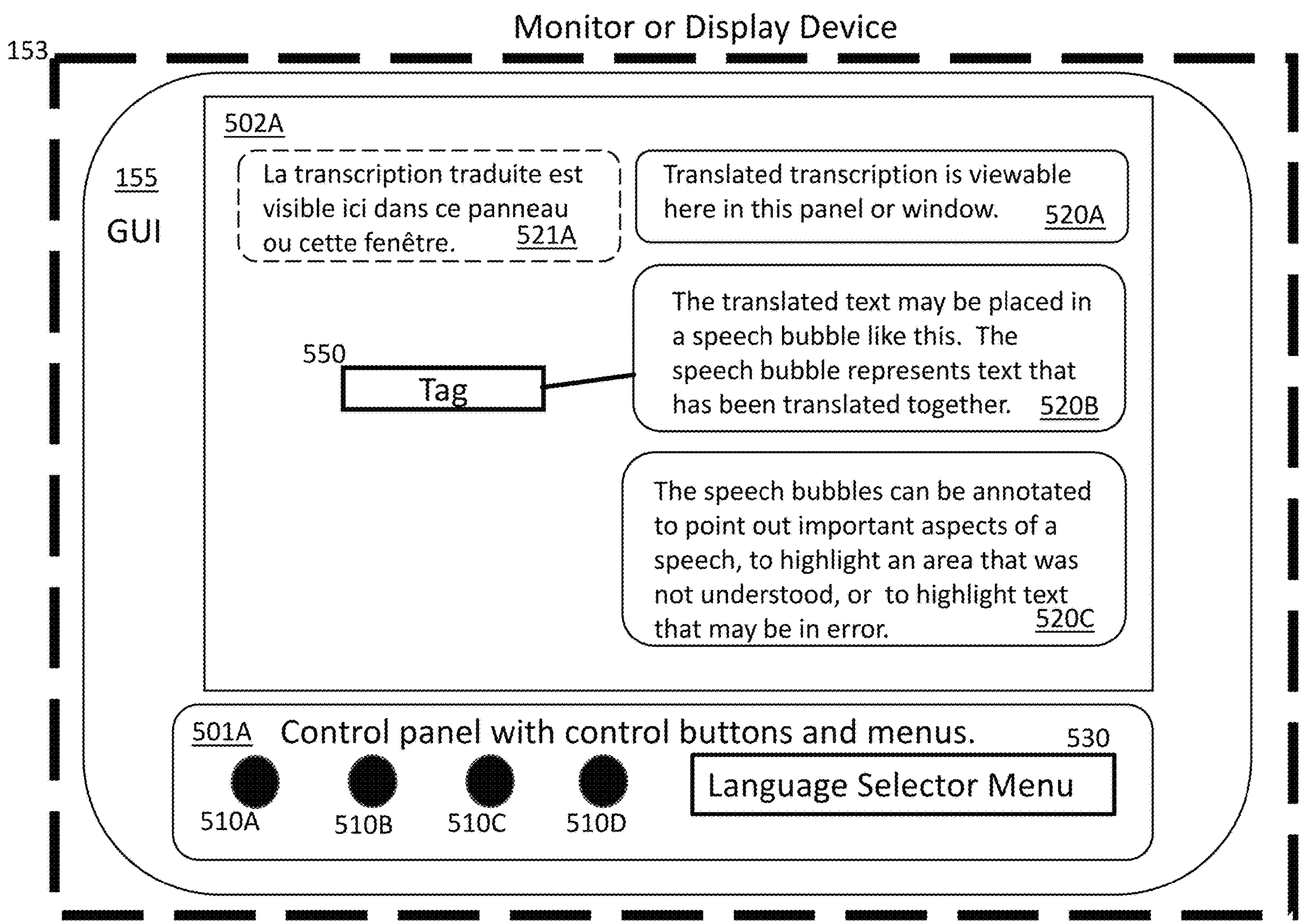
FIGS. 5A-5C are diagrams of graphical user interfaces displayed on a monitor or display device to support the transcription and translation client-server system.

Referring now to FIG. 5A, the attendee client application 108 generates a graphical user interface (GUI) 155 that is displayed on a monitor or display device 153 of the electronic device 106. The GUI 155 includes a language selector menu 530 from which to select the desired language the participant wants to read and optionally listen as well. A mouse, a pointer or other type of GUI input device can be used to select the menu 530 and display a list of a plurality of languages from which one can be selected. The GUI 155 can further include one or more control buttons 510A-510B that can be selected with a mouse, a pointer or other type of GUI input device. The one or more control buttons 510A-510D and the menu 530 can be arranged together in a control panel portion 501A of the GUI 155.

A display window portion 502A of the GUI 155 receives a plurality of speech bubbles 520A-520C each displaying one or more translated transcribe sentences for reading by a participant in his/her selected language. The speech bubbles can display the transcribed and translated from speech spoken by the same participant of by speech that is spoken by two or more participants. Regardless of the language that is spoken by the two or more participants, the text is displayed in the selected language by the user.

The speech bubbles can be selected by the user and highlighted by highlighting or tagged, such as shown by a tag 550 to speech bubble 520B in FIG. 5A. The one or more control buttons 510A-510D can be used to control how the user interacts with the GUI 155.

Figure 5B:
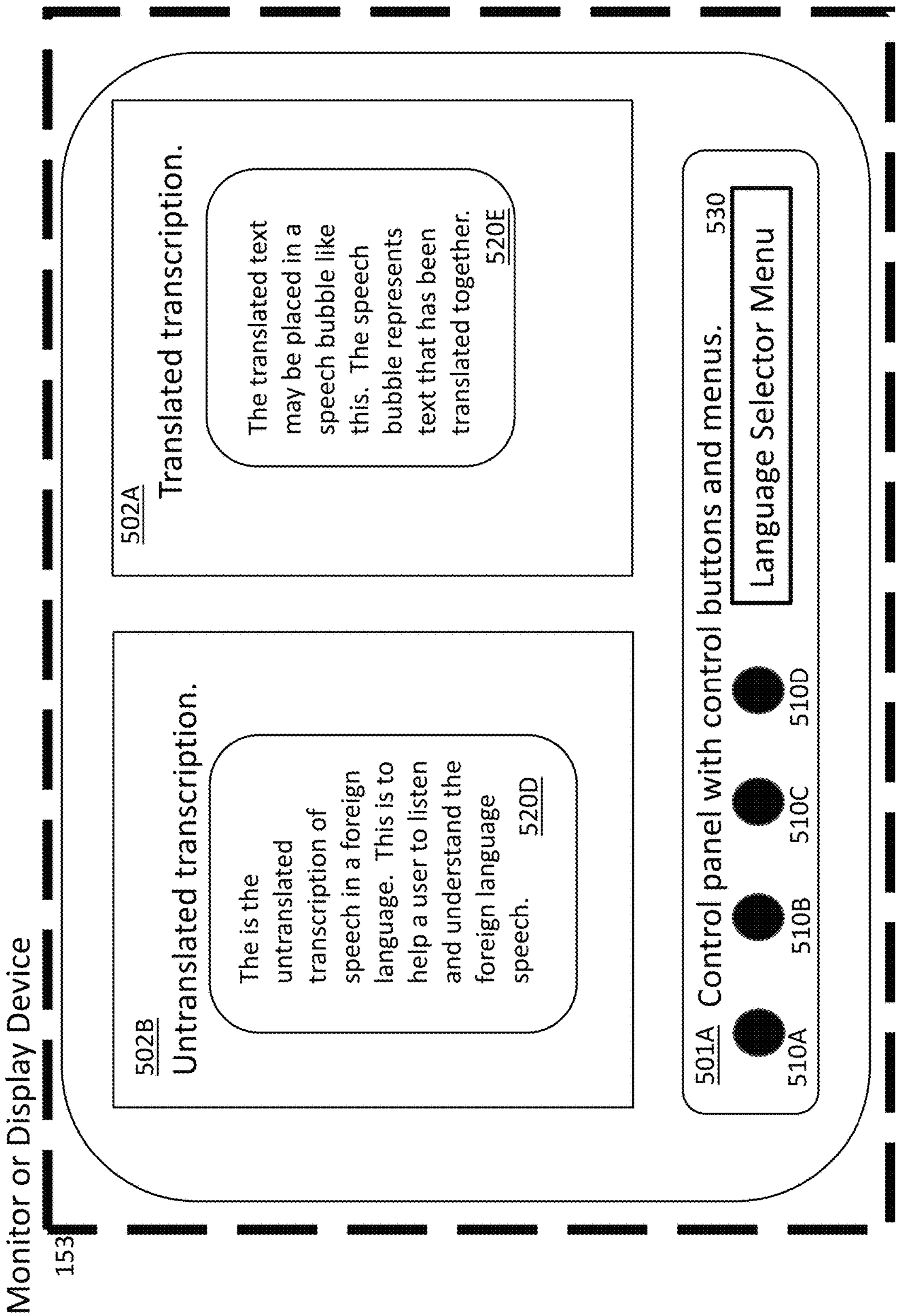
Figure 5C:
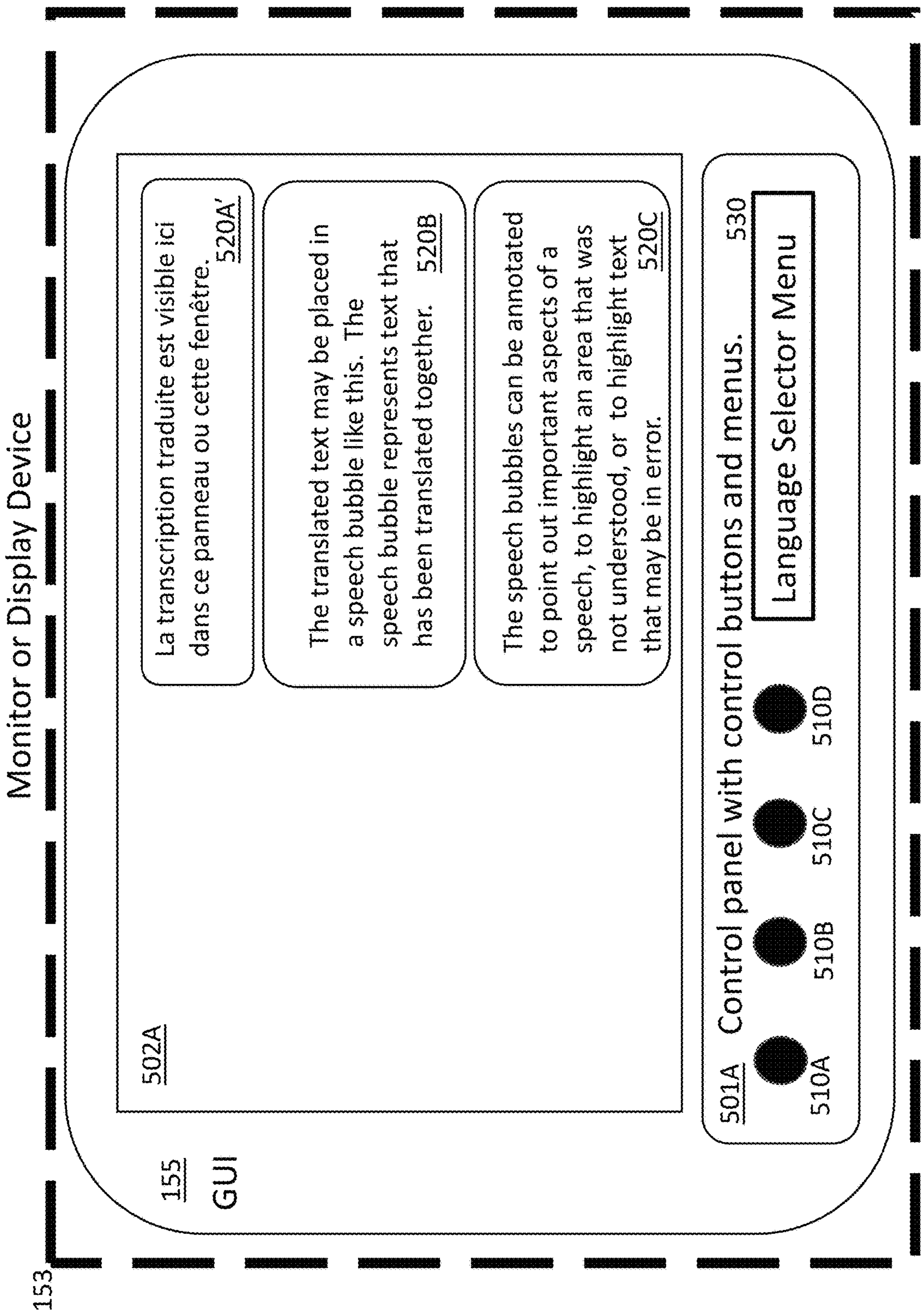

FIGS. 5B-5C illustrate other user interfaces that can be supported by the system 100.

Tags, Highlights, Annotations and Running Meeting Transcripts

Figure 2:
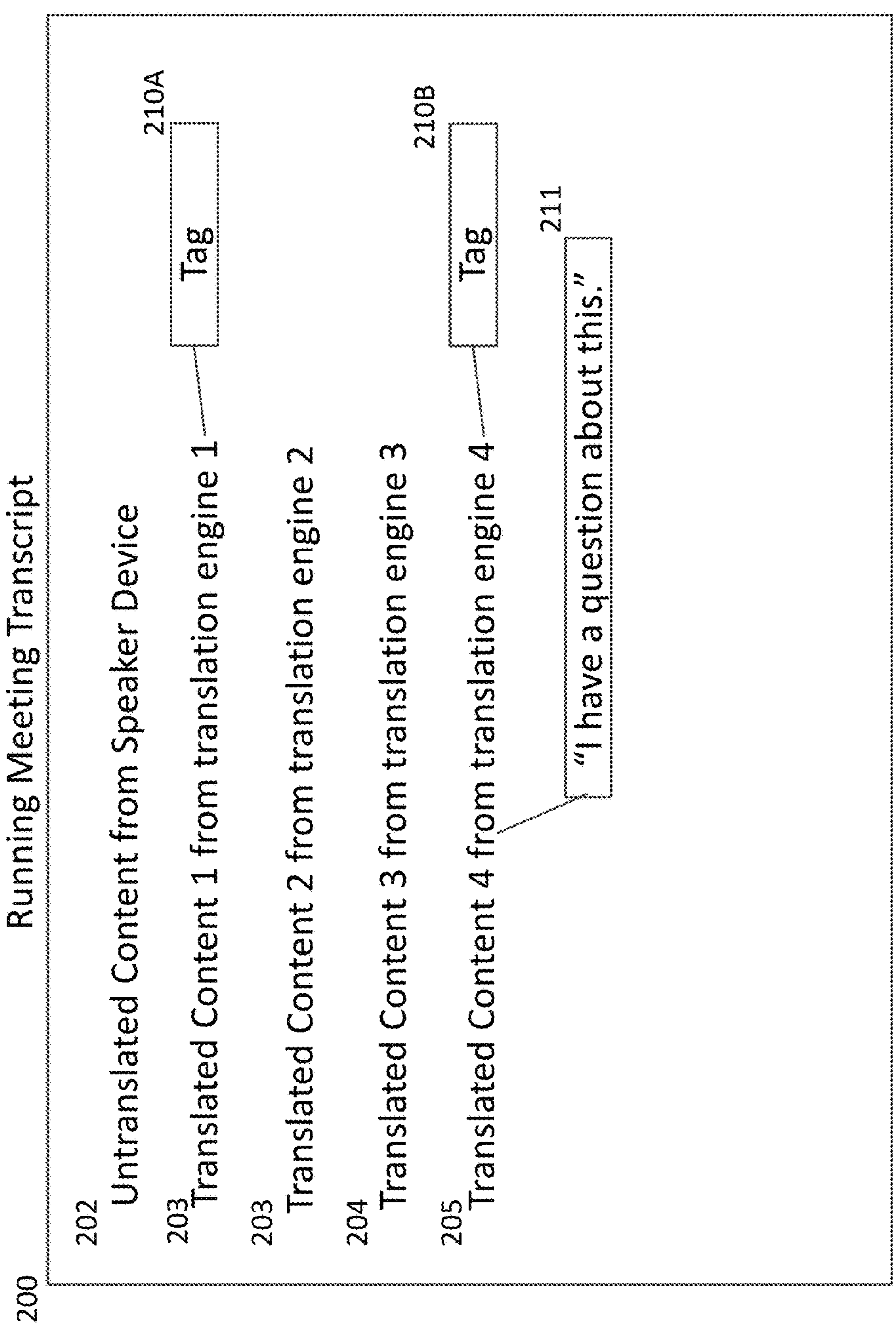
FIG. 2 is an example of a running meeting transcript.

FIG. 2 illustrates an example of a running meeting transcript 200. The entire spoken audio content captured during a meeting session is transformed into text 202-205 by the speech to text service of a transcription engine. The text 203-205 is further translated by each translation engine of the system if multiple speakers are involved using a different language. Some text 202, if already in the desired language of the transcript need not be translated by a translation engine. The transcript text is translated in real time and displayed in speech bubbles on client devices in their requested language.

Participants can interact with the transcript 200 through the speech bubbles displayed on their display devices. The participants can quickly tag the translated transcript text with one or more tags 210A-210B as shown in FIG. 2. Using the software executed on their devices, participants can also submit annotations 211 to their running meeting transcript 200 to highlight portions of a meeting. The submitted annotations can summarize, explain, add to, and question portions of transcribed text.

Multiple final meeting transcripts can be generated based on a meeting that can have a confidential nature to it. In which case, a first transcript of the meeting conference can use a glossary (private glossary) appropriate for internal use within an organization. A second transcript of the same meeting conference can use a general glossary (public glossary) more suited for public viewers of the transcript.

When a participant, whether speaker or listener, sees what he/she believes is a translation or other error (e.g., contextual issue or idiomatic issue) in the transcript, the participant can tag or highlight the error for later discussion and correction. Participants are enabled, as the session is ongoing and translation is taking place on a live or delayed basis, to provide tagging of potentially erroneous words or passages. The participant may also enter corrections to the transcript during the session. The corrections can be automatically entered into an official or secondary transcript. Alternatively, the corrections can be held for later review and official entry into the transcript by others, such as the host or moderator.

Transcripts may be developed in multiple languages as speakers make presentations and participants provided comments and corrections. The software application can selectively blend translated content provided by one translation engine with translated content provided by other translation engines. During a period of the meeting conference, one translation engine may translate better than the other translation engines based on one or more factors. The application can selectively blend translated content based on the first spoken language, the language preferences, subject matter of the content, voice characteristics of the spoken audio content, demonstrated listening abilities and attention levels of users at their respective client devices, and the technical quality of transmission.

Participants can annotate transcripts while the transcripts are being created. Participants can mark or highlight sections of a transcript that they find interesting or noteworthy. A real time running summary (running meeting transcript) may be generated for participants unable to devote full attention to a conference. For example, participants can arrive late or be distracted by other matters during the meeting conference. The running summary (running meeting transcript) can allow them to review what was missed before they arrived or while they were distracted.

The system can be configured by authorized participants to isolate selected keywords to capture passages and highlight other content of interest. When there are multiple speakers, for example during a panel discussion or conference call, the transcript can identify the speaker of translated transcribed text. Summaries limited to a particular speaker's contribution can be generated while other speakers' contributions may not be included or can be limited in selected transcriptions.

User Interfaces with Dual/Switchable Translations

Systems and methods described herein provide for listener verification of translation of content spoken in a first language displayed in a text format of the translated content in a second language of the listener's choosing. A speaker of content in the first language may have his/her content translated for the benefit of an audience that wishes to hear and read the content in a chosen second language. While the speaker is speaking in his/her own language and the spoken content is being translated on a live basis, the spoken content is provided in translated text form in addition to the translated audio.

The present disclosure concerns the translation of the content spoken in the first language into translated text in the second language, and situations in which the text in the second language translation may not be clear or otherwise understandable to the listener/reader. The system 100 further provides the listener/reader a means to select the translated and displayed text and be briefly provided a view of the text in the spoken or first language. The listener/reader can thus get clarification of what the speaker said in the speaker's own language, as long as the listener/reader can read in the speaker's language.

Referring now to FIG. 5B, the speaker and the listener/reader (participants) may view a graphical user interface (GUI) 155 on a monitor 153 of an electronic device. The electronic device may be a mobile device, tablet, or laptop or desktop computer, for example. The speaker's spoken content is viewable in the speaker's language in a first panel 502B of the interface, for example a left-hand panel or pane. The first panel 502B illustrates speech bubbles 520E is an untranslated transcription. The content is then displayed as translated text in the listener's language in a second panel 502A of the interface, for example a right-hand panel or pane.

In one embodiment, the left-hand panel 502B may not be viewable by the listener/reader to avoid confusion, such as shown by FIG. 5A. In another embodiment, one of the control buttons 501A-510D can be used to view the left-hand panel 502B particularly when a listener becomes a speaker in the meeting, such as when asking questions or becoming the host.

As the speaker speaks in a first language (e.g., French), the system may segment the speaker's spoken content into logical portions, for example individual sentences or small groups of sentences. If complete sentences are not spoken, utterances may be translated. The successive portions of the spoken content may be displayed as text in the listener's chosen language (e.g., English) in cells or bubbles 520A-520D of the listener's panel 502A.

The listener can also audibly hear the translated content in his/her chosen language while he/she sees the translated content in text form in the successive bubbles 520A-520D. If the listener is briefly distracted from listening to the spoken translation, he/she can read the successive bubbles 520A-520D to catch up or get a quick summary of what the speaker said. In situations wherein the listener may not be proficient at understanding the audible translation, having the displayed text of the translation can help in understanding the audible translation. For example, if the participants in a room (meeting) insist on everyone using the same translated language for the audible content, a language in which a listener is not proficient, having the displayed text of the translation can help understanding the audible translation.

There may be instances in which a listener is not certain he/she correctly heard what a speaker said. For example, an audio translation may not come through clearly due to lengthy transmission lines and/or wireless connectively issues. As another example, the listener may have been distracted and may have muted the audio portion of the translated content. As another example, the listener may be in a conference room with other persons listening to the presenter on a speaker phone for all to hear. However, all other participants only speak the translated or second language, but the one listener does not. With both the translated panel 502A and the untranslated panel 502B of text displayed by the GUI 155, a listener can read and understand the translated content better in his/her selected displayed language when he/she audibly hears the translated content in a different language.

Referring now to FIG. 5C, instead of side-by-side panels 502A-502B shown in FIG. 5B, the system can provide an alternate method of showing the untranslated content of a speech bubble 520A-520C. In this case, the listener (participant) in this situation who needs clarification can click on or otherwise select the bubble or cell that displays the portion of content about which he/she seeks clarification. For example, the listener (participant) selects the speech bubble 520A in FIG. 5A that is in a translated language (e.g., English—"Translated transcription is viewable here in this panel or window.") selected by the listener (participant) but the speaker is speaking in a different language (e.g., French). When the listener does so, the speech bubble or cell 520A briefly transforms (switches) from the translated transcribed content (e.g., English) to the transcribed content in the speaker's language (e.g., French), such as shown by the speech bubble 520A' ("La transcription traduite est visible ici dans ce panneau ou cette fenêtre.") shown in FIG. 5C.

Referring now to FIG. 5A, an alternate embodiment is shown, instead of the speech bubble or cell 520A transforming into the speech bubble 520A' shown in Figure C. The listener (participant) selects the speech bubble 520A in FIG. 5A such that a second speech bubble or cell 521A briefly appears nearby in the panel 502A of the user interface 155. The bubble or cell 521A displays the transcribed text content in the speaker's language (e.g., French). The appearance of the second cell 521A in the panel 502A of the user interface 155 can be displayed a for predetermined period of time (e.g., several seconds) and then disappear. Alternatively, the appearance of the second cell 521A may be displayed for so long as the user positions or hovers the device's cursor over the speech bubble or cell 520A with the translated transcribed content. Alternatively, the appearance of the second speech bubble or cell 521A can be displayed until the listener (participant) takes some other explicit action. For example, the user can select one of the control buttons 510A-510D or the second speech bubble 521A itself displayed in the monitor or display device to make the second speech bubble 521A disappear.

Example Remote Conference

Figure 6:
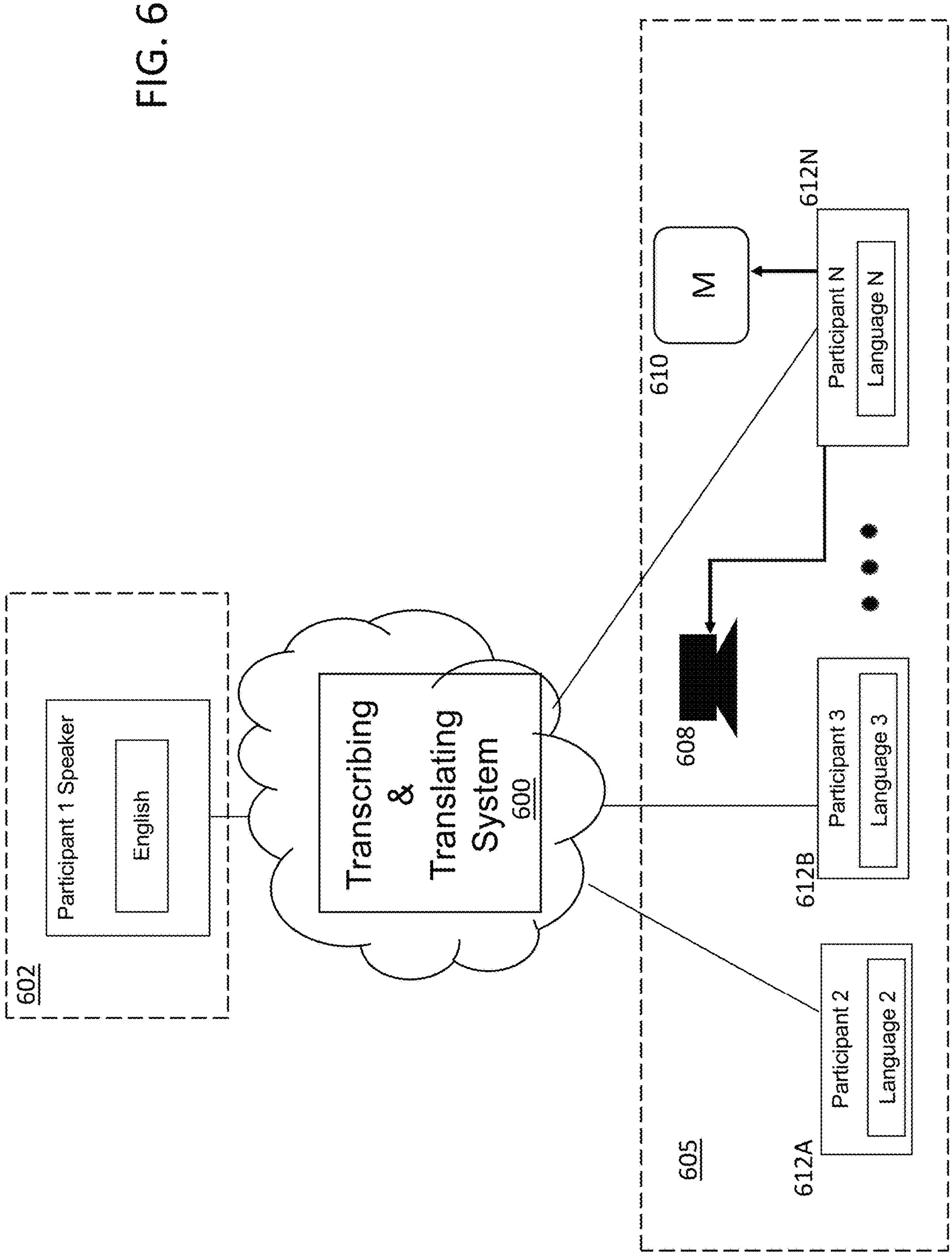
FIG. 6 is a conceptual diagram of a conference between a speaker/host participant in one room and listener participants in a remotely located room using the transcription and translation client server system.

Referring now to FIG. 6, consider an example of a conference or a cloud-based meeting involving multiple participants where the host/presenter 601 speaks English (native language) in one room 602 that is broadcast through the internet cloud to a remotely located room 605 including a plurality of people (listeners) 612A-612N. One of the people (participant listener) in the room, such as participant N 612N, can couple his/her electronic device 106 to one or more room loudspeakers 608 and one or more room monitors M 610 to share with the other participants in the room 605. Accordingly, the transcribing and translating system 600 disclosed herein can be configured to audibly broadcast the presenter's spoken content translated into French (foreign language) into the room 605 over one or more loudspeakers 608 therein. The system 600 can be further configured to display the presenter's textual content translated into French text on a monitor M 610 in the remotely located room 605. The translated textual content is displayed in speech bubbles or cells on the monitor 610 in the remotely located room 605. One or more people 612A-612N in the remotely located room 605 can also access the system 600 via their own personal electronic devices. On monitors or display devices 153 of their personal electronic devices 106 shown in FIG. 1C, the people (listeners) 612A-612N can read the displayed content in French text (or other user selected language) while hearing the presenter's spoken content in French language over the loudspeakers 608.

While the presenter 601 is speaking the English language and the attendees (people) 612A-612N in the remote room are hearing French language and seeing/reading in French text. However, consider the case that a portion of the presenter's broadcasted spoken material translated into French does not sound quite right (e.g., participant identifies broadcasted spoken material as being an inaccurate translation) or does not read quite correctly to one or more attendees (e.g., participant identifies the written translation as being an inaccurate translation). Jargon and slang in English, both American English and other variants of English do not always translate directly into French or other languages. Languages around the world feature nuances and differences that can make translation difficult. This may be particularly true in business conversations wherein industry jargon, buzzwords, and internal organizational jargon simply do not translate well into other languages. This system can assist the attendee if something in French text in the speech bubble does not read quite right or is something generated in French language audio is not heard quite right from the loudspeakers. The listener attendee may want to see the English text transcribed from what the presenter/host spoke, particularly if they are bilingual or have some understanding of the language that the presenter is speaking.

The attendee can click on or otherwise activate the speech bubble (e.g., bubble 520A' shown in FIG. 5C) displaying French text associated with the translated sentence. The system can transform from displaying French text into displaying English text in the speech bubble (e.g., bubble 520A shown in FIG. 5A) transcribed from what the presenter said in English. The attendee can read the English text instead of a confusing translation of English language. The transcribed words and sentence the presenter spoke in English are displayed in the speech bubble 520A. In this manner the attendee listener can momentarily read the untranslated transcribed text of the speaker/host for clarification.

Systems and methods provided herein therefore provide an attendee listening and reading in the attendee's chosen language to review text of a speaker's content in the speaker's own language. The attendee can gain clarity by taking discreet and private action without interrupting the speaker or otherwise disturbing the flow of a meeting or presentation.

Advantages

There are a number of advantages to the disclosed transcribing and training system. Unnecessarily long meetings and misunderstandings among participants may be made fewer using systems and methods provided herein. Participants that are not fluent in other participants' languages are less likely to be stigmatized or penalized. Invited persons, who might otherwise be less inclined to participate because of language shortcomings, may participate in their own native language, enriching their experience. The value of their participation to meeting is also enhanced because everyone, in the language(s) of their choice, can read the meeting transcript in real time while concurrently hearing and speaking in the language(s) of their choice. Furthermore, the systems and methods disclosed herein eliminate the need for special headsets, sound booths, and other equipment to perform translations for each meeting participant.

As a benefit, extended meetings may be shorter and fewer through use of the systems and methods provided herein. Meetings may as a result have an improved overall tenor as the flow of a meeting is interrupted less frequently due to language problems and the need for clarifications and corrections. Misunderstandings among participants may be reduced and less serious.

Participants that are not fluent in other participants' languages are less likely to be stigmatized, penalized, or marginalized. Invited persons who might otherwise be less inclined to participate because of language differences may participate in their own native language, enriching their experience and enabling them to add greater value.

The value of participation by such previously shy participants to others is also enhanced as these heretofore hesitant participants can read the meeting transcript in their chosen language in near real time while hearing and speaking in their chosen language as well. The need for special headsets, sound booths, and other equipment to perform language translation by a human being is eliminated.

Closing

The embodiments are thus described. While certain exemplary embodiments have been described and shown in the accompanying drawings, it is to be understood that such embodiments are merely illustrative of and not restrictive on the broad invention, and that the embodiments are not limited to the specific constructions and arrangements shown and described, since various other modifications may occur to those ordinarily skilled in the art.

When implemented in software, the elements of the disclosed embodiments are essentially the code segments to perform the necessary tasks. The program or code segments can be stored in a processor readable medium or transmitted by a computer data signal embodied in a carrier wave over a transmission medium or communication link. The "processor readable medium" may include any medium that can store information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded using a computer data signal via computer networks such as the Internet, Intranet, etc. and stored in a storage device (processor readable medium).

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. A computer "device" includes computer hardware, computer software, or a combination thereof.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination.

Moreover, although features may be described above as acting in certain combinations and even initially claimed as such, one or more features from a claimed combination may in some cases be excised from the combination, and the claimed combination may be directed to a sub-combination or variations of a sub-combination. Accordingly, while embodiments have been particularly described, they should not be construed as limited by such disclosed embodiments.

What is claimed is:

1. A method for managing a cloud-based meeting involving multiple languages, the method comprising:

receiving, from a first microphone at a first client device, first audio content in a first language preference of a first meeting participant, wherein the first meeting participant interacts with the meeting by using a first attendee application pre-assigned to only the first meeting participant;

transcribing the first audio content into a first transcribed text by using the first language preference;

receiving, from a second client device, a second language preference that is different from the first language preference, the second language preference being that of a second meeting participant, wherein the second meeting participant interacts with the meeting by using a second attendee application pre-assigned to only the second meeting participant and separate from the first attendee application;

translating the first transcribed text into a second transcribed text by applying artificial intelligence to the second language preference;

transmitting the first transcribed text and the second transcribed text to the second client device, wherein the second client device is configured to optionally display the first transcribed text and the second transcribed text on a display device.

2. The method of claim 1, further comprising:

transforming the second transcribed text into second audio content in the second language preference, wherein the second audio content is effectively a translation of the first audio content from the first language preference into the second language preference.

3. The method of claim 1, further comprising:

displaying, within a graphical user interface of the second client device, the first transcribed text in a first text bubble; and displaying the second transcribed text in a second text bubble.

4. The method of claim 3, wherein the first transcribed text and the second transcribed text are displayed simultaneously in real time.

5. The method of claim 1, further comprising:

generating, at the second client device, an audio signal from the second transcribed text; and driving a loudspeaker to generate spoken words based on the audio signal from the second transcribed text, wherein the generated spoken words are effectively a translation of the first audio content from the first language preference into the second language preference.

6. The method of claim 1, wherein the second transcribed text is identified as being an inaccurate translation of the first audio content.

7. The method of claim 6, further comprising:

displaying, on a graphical user interface of the second client device, the second transcribed text in a second text bubble;

receiving a selection of the second text bubble from the second meeting participant; and in response to receiving the selection of the second text bubble, displaying the first transcribed text in a first text bubble on the graphical user interface of the second client device, wherein the displaying of the first transcribed text enables the second meeting participant to view an original transcription of the first audio content.

8. The method of claim 7, wherein the first text bubble is displayed alongside the second text bubble.

9. The method of claim 7, wherein the second text bubble is switched to display the first text bubble in place of the second text bubble.

10. The method of claim 1, further comprising:

receiving, from a second microphone at the second client device, third audio content in the second language preference; and transcribing the third audio content into a third transcribed text by using the second language preference.

11. The method of claim 10, wherein the third audio content is responsive to the second audio content within a conversation in the cloud-based meeting.

12. The method of claim 10, further comprising:

translating the third transcribed text into a fourth transcribed text by using the first language preference; and transmitting the third and fourth transcribed text to the first client device, wherein the first client device is configured to generate fourth audio content from the fourth transcribed text and to display the third and fourth transcribed text, and wherein the fourth audio content is effectively a translation of the third audio content.

13. The method of claim 12, wherein the third audio content is responsive to the second audio content within a conversation in the cloud-based meeting, and wherein the fourth audio content is thereby also responsive to the second audio content.

14. The method of claim 1, wherein a room includes at least the second client device and a third client device, and wherein the transmitting further comprises:

transmitting the first and second transcribed text to the third client device, wherein the transmitting to the second client device and the transmitting to third client device are simultaneous.

15. A system for managing a cloud-based meeting involving multiple languages, the system comprising:

at least one server device including a processor device and a memory device coupled to the processor device, wherein the memory device stores an application that configures the server device to perform:

receiving, from a first microphone at a first client device, first audio content in a first language preference of a first meeting participant, wherein the first meeting participant interacts with the meeting by using a first attendee application pre-assigned to only the first meeting participant;

transcribing the first audio content into a first transcribed text by using the first language preference;

receiving, from a second client device, a second language preference that is different from the first language preference, the second language preference being that of a second meeting participant, wherein the second meeting participant interacts with the meeting by using a second attendee application pre-assigned to only the second meeting participant and separate from the first attendee application;

translating the first transcribed text into a second transcribed text by applying artificial intelligence to the second language preference;

transmitting the first transcribed text and the second transcribed text to the second client device, wherein the second client device is configured to optionally display the first transcribed text and the second transcribed text on a display device.

16. The system of claim 15, wherein the server is further configured to perform:

transforming the second transcribed text into second audio content in the second language preference, wherein the second audio content is effectively a translation of the first audio content from the first language preference into the second language preference.

17. The system of claim 16, wherein the second client device is further configured to perform:

displaying, on a graphical user interface of the second client device, a first transcribed text in a first text bubble; and displaying the second transcribed text in a second text bubble.

18. The system of claim 17, wherein the first transcribed text and the second transcribed text are displayed simultaneously in real time.

19. The system of claim 15, wherein generating the second audio content comprises:

generating, at the second client device, a speech signal from the second transcribed text; and driving a loudspeaker to generate spoken words based on the speech signal from the second transcribed text, wherein the spoken words are effectively a translation of the first audio content.

20. The system of claim 15, wherein the second transcribed text is identified as being an inaccurate translation of the first audio content.

* * * * *